United States Patent
Premont et al.

(10) Patent No.: US 8,614,569 B2
(45) Date of Patent: Dec. 24, 2013

(54) METHOD OF CONTROLLING A SWITCHED-MODE POWER SUPPLY HAVING A SINGLE INDUCTIVE ELEMENT AND SEVERAL OUTPUTS, AND CORRESPONDING POWER SUPPLY, IN PARTICULAR FOR A CELLULAR MOBILE TELEPHONE

(75) Inventors: Christophe Premont, Sassenage (FR); David Chesneau, Grenoble (FR); Christophe Bernard, Claix (FR)

(73) Assignee: ST-Ericsson SA, Plan-les-Ouates (CH)

( * ) Notice: Subject to any disclaimer, the term of this patent is extended or adjusted under 35 U.S.C. 154(b) by 767 days.

(21) Appl. No.: 12/053,770

(22) Filed: Mar. 24, 2008

(65) Prior Publication Data
US 2008/0297127 A1 Dec. 4, 2008

(30) Foreign Application Priority Data
Apr. 24, 2007 (FR) .................................. 07 54668

(51) Int. Cl.
G05F 1/563 (2006.01)
G05F 1/575 (2006.01)
G05F 1/585 (2006.01)

(52) U.S. Cl.
USPC .............. 323/282; 323/267; 323/272; 363/69

(58) Field of Classification Search
USPC ........ 363/65, 67, 69; 323/225, 282, 284, 285, 323/267, 269, 271, 272; 307/11–12, 31–34, 307/38, 41
See application file for complete search history.

(56) References Cited

U.S. PATENT DOCUMENTS

| | | | | |
|---|---|---|---|---|
| 5,617,015 | A * | 4/1997 | Goder et al. | 323/282 |
| 6,075,295 | A * | 6/2000 | Li | 307/39 |
| 6,222,352 | B1 * | 4/2001 | Lenk | 323/267 |
| 6,522,110 | B1 | 2/2003 | Ivanov | 323/267 |
| 6,636,022 | B2 * | 10/2003 | Sluijs | 323/222 |
| 7,276,886 | B2 * | 10/2007 | Kinder et al. | 323/267 |
| 7,298,116 | B2 * | 11/2007 | Sluijs | 323/222 |
| 2002/0011824 | A1 * | 1/2002 | Sluijs | 323/222 |
| 2004/0201281 | A1 * | 10/2004 | Ma et al. | 307/38 |
| 2005/0225176 | A1 * | 10/2005 | Gan et al. | 307/31 |
| 2006/0176031 | A1 * | 8/2006 | Forman et al. | 323/267 |

(Continued)

FOREIGN PATENT DOCUMENTS

EP 1427092 6/2004 ............ H02M 3/155

OTHER PUBLICATIONS

"Single-Inductor Multiple-Output Switching Converters with Bipolar Outputs", Ma et al., ISCAS 2001, Proceedings of the 2001 IEEE International Symposium on Circuits and Systems, Sydney, Australia, May 6-9, 2001, IEEE International Symposium on Circuits and Systems, New York, NY, US, vol. 1 of 5, pp. 301-304, XP010541136, ISBN: 0-7803-6685-9.

"A Single-Inductor Multiple-Output Converter with Peak Current State-Machine Control", Bayer et al. Applied Power Electronics Conference and Exposition, 2006. APEC '06, 21$^{st}$ Annual IEEE, Mar. 19, 2006, Piscataway, NJ, USA, pp. 153-159, XP010909937, ISBN: 0-7803-9547-6.

(Continued)

Primary Examiner — Adolf Berhane
Assistant Examiner — Nusrat Quddus
(74) Attorney, Agent, or Firm — Coats & Bennett, PLLC

(57) ABSTRACT

The switched-mode power supply includes a switching cell having an inductive element with two connections and several individually selectable outputs, and in which the two connections of the inductive element are joined respectively to at least two of the individually selectable outputs. It is thus possible to generate and regulate at least two different voltages, one positive and one negative.

16 Claims, 4 Drawing Sheets

(56) References Cited

U.S. PATENT DOCUMENTS

| | | |
|---|---|---|
| 2006/0198165 A1* | 9/2006 | O'Driscoll et al. ............ 363/13 |
| 2006/0214648 A1* | 9/2006 | Liu et al. ...................... 323/222 |
| 2006/0221649 A1* | 10/2006 | Yamanaka et al. ............. 363/19 |
| 2007/0030617 A1* | 2/2007 | Derckx et al. ................ 361/143 |
| 2007/0252563 A1* | 11/2007 | Kumagai et al. ............. 323/267 |
| 2007/0273337 A1* | 11/2007 | Tolle et al. ................... 323/222 |

OTHER PUBLICATIONS

"Single-Inductor Multiple-Output Switching Converters", Ki et al., 32$^{nd}$ Annual IEEE Power Electronics Specialists Conference, PESC 2001, Conference Proceedings, Vancouver, Canada, Jun. 17-21, 2001, Annual Power Electronics Specialists Conefence, New York, NY, vol. 1 of 4, Conf. 32, pp. 226-231, XP010559152, ISBN: 0-7803-7067-8.

* cited by examiner

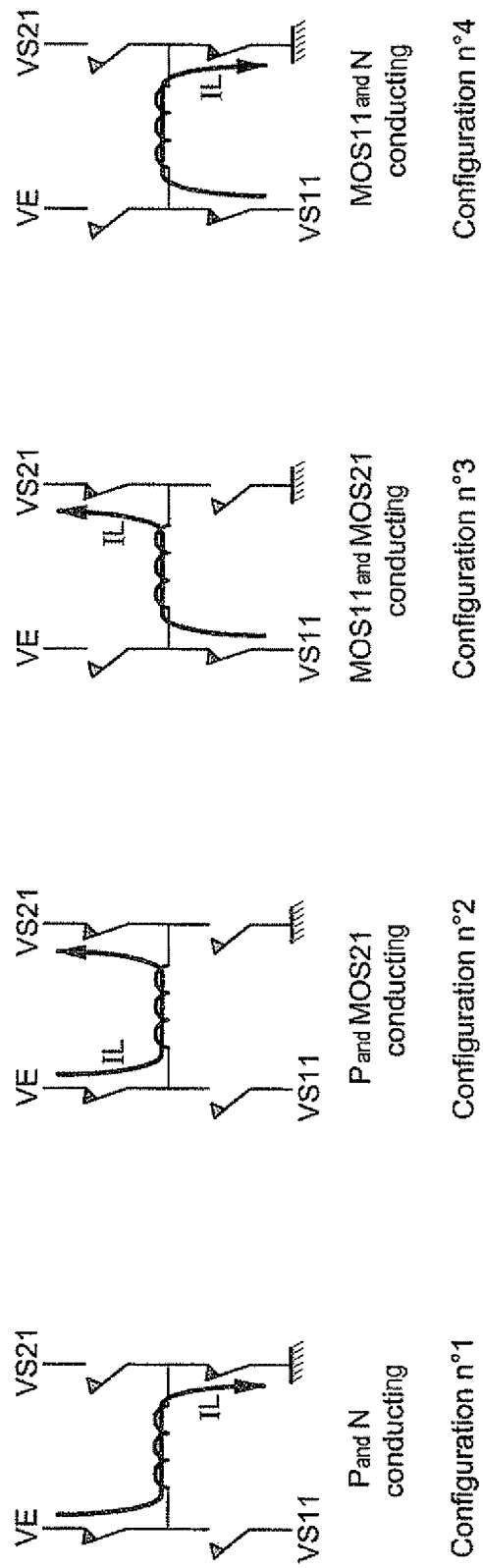

METHOD OF CONTROLLING A SWITCHED-MODE POWER SUPPLY HAVING A SINGLE INDUCTIVE ELEMENT AND SEVERAL OUTPUTS, AND CORRESPONDING POWER SUPPLY, IN PARTICULAR FOR A CELLULAR MOBILE TELEPHONE

FIELD OF THE INVENTION

The invention relates in general to switched-mode power supplies, and more particularly to switched-mode power supplies including a single inductive element and several regulated outputs.

BACKGROUND OF THE INVENTION

The invention applies advantageously, but not limitingly, to battery-powered portable systems, in particular but not exclusively the remote terminals of wireless communication systems, for example cellular mobile telephones. Integrated systems for energy management in portable applications (battery operation) increasingly require different output voltages that are to be regulated, on the basis of an ever lower battery voltage.

A traditional approach includes creating a voltage regulated on the basis of the supply voltage with a linear regulator. This regulator uses an external capacitor to achieve its function. And use is made of as many linear regulators as outputs to be regulated. A drawback of this type of regulator is its low efficiency.

To alleviate this problem of low efficiency, use is made of switched-mode power supplies, also called "DC-DC converters". The efficiencies are then close to SS to 90%, while under the same conditions, a linear regulator would have an efficiency of only 50%. However, a switched-mode power supply uses an inductive element in addition to a capacitor.

To regulate several outputs, it is conceivable to use several switched-mode power supplies. But this then presupposes the implementation of as many inductive elements, thereby increasing the cost and the surface area of the integrated circuit. Hence, the use has been envisaged of switched-mode power supplies capable of regulating several distinct outputs with a single inductive element. However, it is not always possible to retain a sufficient dynamic range between the various output voltages.

Additionally, contemporary switched-mode power supply systems do not make it possible to create, at output, regulated voltages with different signs. One approach for obtaining a positive voltage and a negative voltage includes using at least two linear regulators, with their aforesaid drawbacks, and a large number of external components.

SUMMARY OF THE INVENTION

According to a mode of implementation, it is proposed to regulate various independent outputs in terms of energy levels, using a single inductive element and exhibiting a larger dynamic range, or difference of voltages between two regulated outputs.

According to a mode of implementation, it is possible to generate a negative voltage without calling upon technologies making it possible to manage high voltages.

According to an aspect, there is proposed a switched-mode power supply, comprising a switching cell comprising a single inductive element with two connections nodes or points and several individually selectable outputs, in which the two connections of the inductive element are joined respectively to at least two of the individually selectable outputs.

It is thus possible to generate and regulate at least two different voltages, one positive and one negative. This makes it possible to regain on the one hand a correct dynamic range on the basis of a low battery voltage. Moreover, for certain applications such as audio amplifiers, this also makes it possible to obtain symmetric supply voltages making it possible to reduce the filtering and the design problems related to a nonzero common mode. Finally, such a power supply may be realized on silicon and can generate a negative voltage without calling upon technologies making it possible to manage high voltages. The controller may also be able to simultaneously select at least two of the individually selectable outputs.

According to an embodiment, the switching cell includes a first controllable selection unit or means possessing an input connection linked to a first connection of the inductive element and one or more output connections respectively linked to the output or outputs joined to the first connection of the inductive element. A second controllable selection unit or means includes an input connection linked to the second connection of the inductive element and one or more output connections respectively linked to the output or outputs joined to the second connection of the inductive element, and a capacitor per output includes a connection linked to the corresponding connection of the corresponding selection means.

The switched-mode power supply may also comprise two breakers linked respectively between a supply voltage and one of the connections of the inductive element, and between ground and one of the connections of the inductive element.

According to an embodiment, the switching cell is controllable cyclically by a slaving loop. The slaving loop comprises determination means able, in the course of each conduction cycle, to determine a total energy corresponding to the sum of the elementary energies required respectively by all the outputs in the course of this cycle, and control means able, in the course of this cycle, to control the switching cell so as to inject, possibly several times, the total energy into the inductive element, to select, possibly repeatedly, the outputs requiring a nonzero elementary energy and to restore on each selected output, the corresponding elementary energy.

This embodiment makes it possible to obtain conduction of continuous type, that is to say continuity of the current in the inductive element from one cycle to another. The controller or control means may also be able, in the course of each conduction cycle, to select successively and in an identical predetermined order for all the cycles, the outputs requiring a nonzero elementary energy. One of the outputs joined to the first connection of the inductive element and one of the outputs joined to the second connection of the inductive element can exhibit voltages of opposite signs and of equal absolute values.

According to another aspect, there is proposed a terminal of a wireless communication system, incorporating a switched-mode power supply, such as defined above. This terminal may define a cellular mobile telephone. When the terminal comprises a battery and an audio amplifier, the switched-mode power supply is powered by the battery of the terminal and the voltage for regulating the audio amplifier can be the voltage difference available between two outputs joined respectively to the two connections of the inductive element of the switched-mode power supply.

According to another aspect, there is proposed a method of controlling a switched-mode power supply, comprising a switching cell comprising a single inductive element with two connections and several individually selectable outputs, in which, the two connections of the inductive element being respectively joined to at least two of the individually selectable outputs, the control of the switching cell comprises the selection of at least two outputs respectively joined to the two connections of the inductive element. In particular, the control of the switching cell may comprise the simultaneous selection of at least two outputs respectively joined to the two connections of the inductive element.

According to a mode of implementation, the switching cell is controllable cyclically and, in the course of each conduction cycle, a total energy corresponding to the sum of the elementary energies required respectively by all the outputs in the course of this cycle is injected, possibly several times, into the inductive element; the outputs requiring a nonzero elementary energy are selected, possibly repeatedly and the corresponding elementary energy is restored on each selected output.

In particular, in the course of each conduction cycle, it is possible to select successively and in an identical predetermined order for all the cycles, the outputs requiring a nonzero elementary energy. It is possible to select two outputs joined respectively to the two connections of the inductive element according to a command so as to obtain voltages of opposite signs and of equal absolute values.

In an advantageous application, the switched-mode power supply can be incorporated into a terminal of a wireless communication system, for example a cellular mobile telephone, comprising a battery and an audio amplifier. The switched-mode power supply is then for example powered by the battery of the terminal and the voltage of the audio amplifier is then for example regulated with the voltage difference available between two outputs joined respectively to the two connections of the inductive element of the switched-mode power supply.

BRIEF DESCRIPTION OF THE DRAWINGS

Other advantages and characteristics of the invention will be apparent on examining the detailed description of nonlimiting embodiments and modes of implementation and the appended drawings, in which:

FIG. 4 is a schematic diagram illustrating a mode of implementation of the method of controlling a switched-mode power supply.

DETAILED DESCRIPTION OF THE PREFERRED EMBODIMENTS

Figure 1:
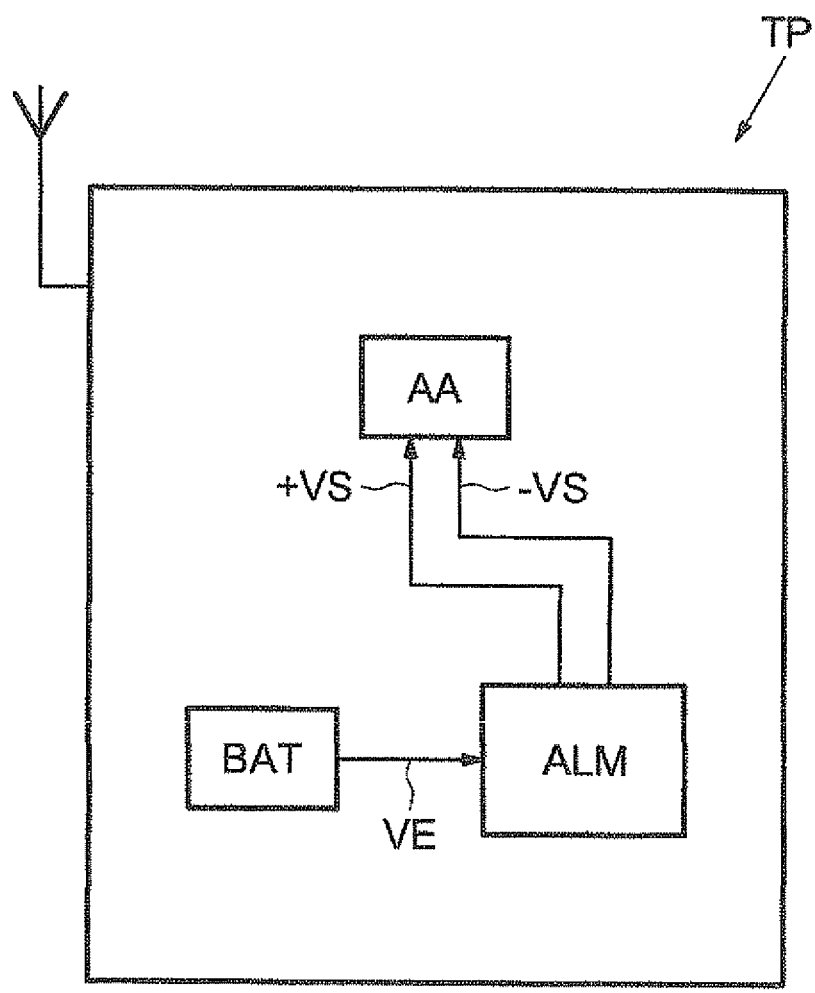
FIG. 1 is a schematic block diagram illustrating a cellular mobile telephone incorporating a switched-mode power supply.

In FIG. 1, the reference TP globally designates a remote terminal of a wireless communication system, for example a cellular mobile telephone. This mobile telephone comprises an audio amplifier AA. The audio amplifier AA is supplied by two symmetric regulated voltages +VS and −VS, delivered by two outputs of a switched-mode power supply ALM. Additionally, the switched-mode power supply ALM is supplied by a supply voltage VE delivered by a battery. By way of example, this voltage VE can vary, as a function of the state of the battery, between 2.5 volts and 5.5 volts.

Figure 2:
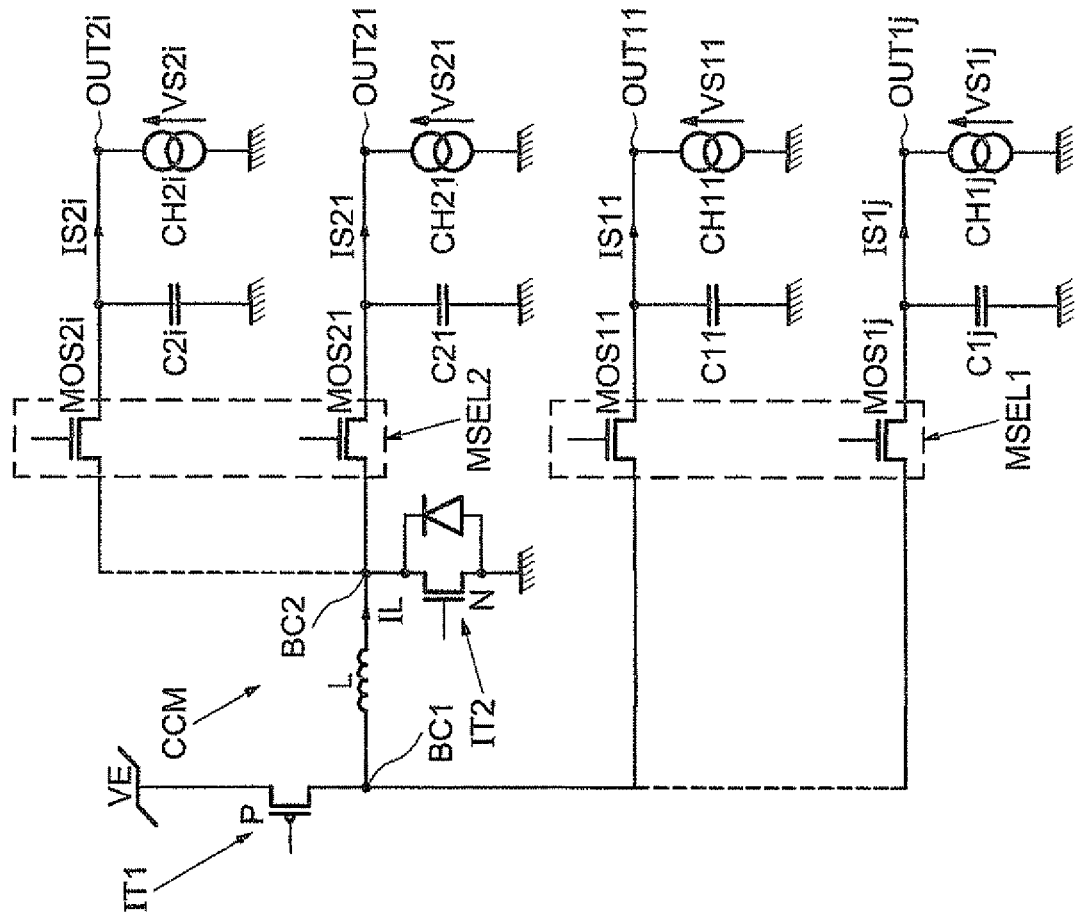
FIG. 2 is a schematic diagram illustrating in greater detail, a switching cell for a switched-mode power supply.
Figure 3:
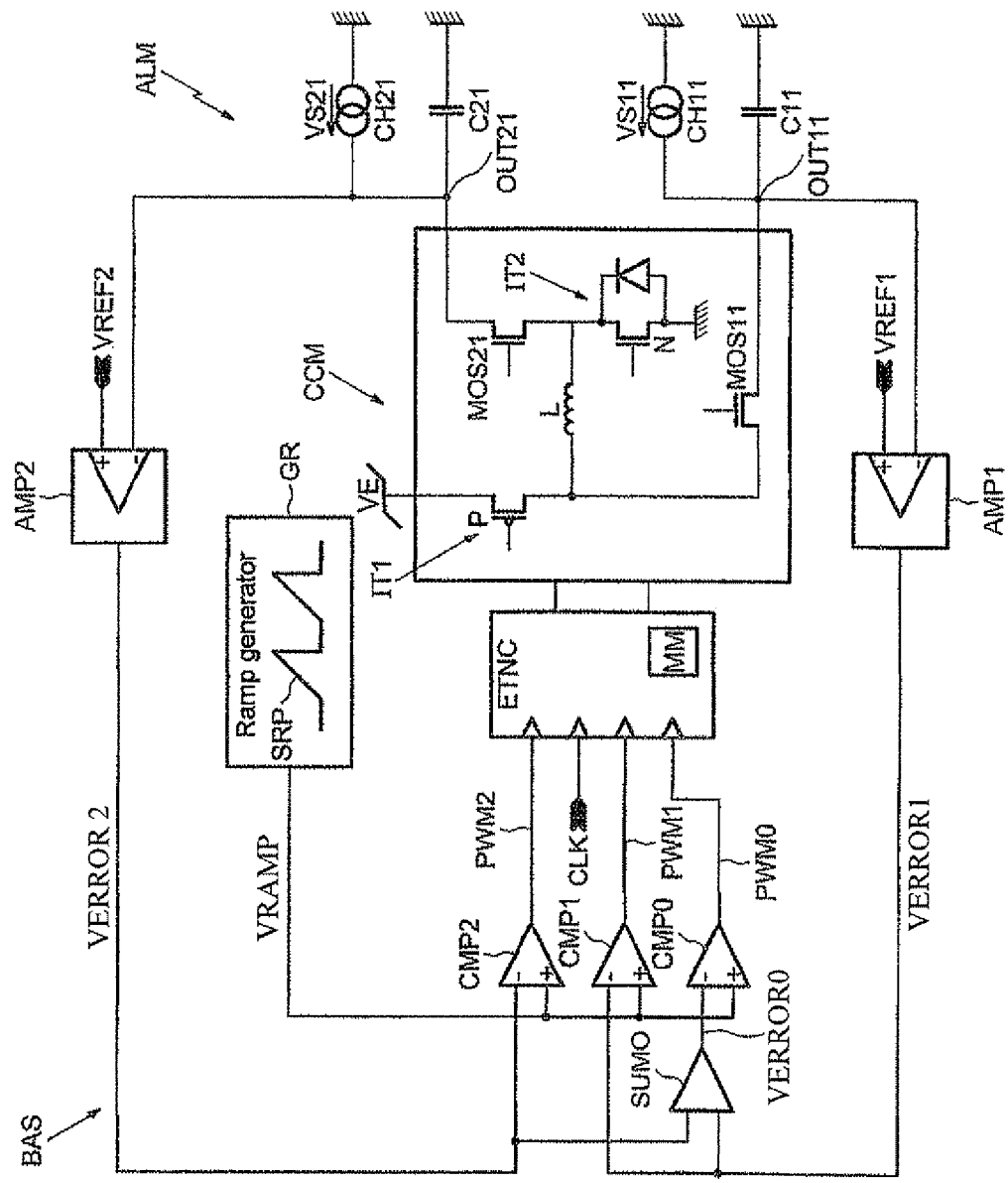
FIG. 3 is a schematic diagram illustrating in greater detail, an embodiment of a switched-mode power supply comprising two outputs.

Reference will now be made more particularly to FIGS. 2 to 4, for a particular embodiment of a switched-mode power supply ALM. In the embodiment described, the switched-mode power supply is a power supply of the voltage step-down type, in the sense that the regulated voltage delivered on each of the outputs of the power supply is equal to the product of the supply voltage VE times a coefficient α less than 1. This coefficient α is the duty ratio of the switched-mode power supply. That said, the invention is not limited to the use of a switched-mode power supply of the "voltage step-down" type, but could also apply to a power supply of the "voltage step-up" type.

The switched-mode power supply comprises a switching cell CCM formed of two breakers IT1 and IT2, respectively including in this example a P-channel field-effect transistor (PMOS transistor) supplied by the supply voltage VE, and by an N-channel insulated-gate field-effect transistor (NMOS transistor) connected to ground. The switching cell CCM here also comprises a single inductive element L linked between a first connection BC1 common with the breaker IT1, and a second connection BC2 common with the breaker IT2.

The switching cell CCM also comprises several outputs OUT11-OUT1$j$ and OUT21-OUT2$i$, which also form the outputs of the switched-mode power supply. Each output OUT1$j$, OUT2$i$ is associated with a capacitor C1$j$, C2$i$ linked between this output and ground. The capacitor C1$j$, C2$i$, associated with each output OUT1$j$, OUT2$i$, thus plays the role of energy reservoir so as to continue to supply the unselected output and maintain the voltage on the output, until the latter is again selected.

Additionally, for each output, a load CH1$j$, CH2$i$ supplied by the regulated voltage VS1$j$, VS2$i$ delivered by the corresponding output has been represented in FIG. 2. Additionally, a current IS1$j$, IS2$i$ flows in this load CH1$j$, CH2$i$. Thus, in the example of the application of the cellular mobile telephone mentioned above, the loads CH11 and CH21 may be for example the audio amplifier AA, and the regulated voltages VS11 and VS21 may be respectively the voltages −VS and +VS of the power supply of the audio amplifier AA.

Finally, each output OUT1$j$ is linked to the connection BC1 by way of an elementary breaker, here formed of a selection transistor MOS1$j$, which can be an N-channel or P-channel transistor. Likewise, each output OUT2$i$ is linked to the connection BC2 by way of an elementary breaker, here formed of a selection transistor MOS2$i$, which can also be an N-channel or P-channel transistor. The set of the elementary breakers MOS11-MOS1$j$ defines a first selection means MSEL1, and the set of the elementary breakers MOS21-MOS2$i$ defines a second selection means MSEL2. The first and second selection means MSEL1, MSEL2 make it possible to individually select the outputs of the switched-mode power supply.

A particular embodiment is now described in which the switched-mode power supply is controlled by a slaving loop in such a way as to store a defined energy in the inductive element and then to restore this energy at the various outputs. However, the invention is not limited to this particular embodiment but also comprises any type of switched-mode power supply. In particular, the switched-mode power supply can be devoid, for example, of a slaving loop and systematically restore the energy at an output after or during the storage of this energy in the inductive element.

The breaker IT1 is successively and alternately closed and open, so as to allow storage of energy in the inductive element, followed by restoration of this energy. The duration for which the breaker is open and closed in the course of each conduction cycle depends on the duty ratio α. The energy stored in the inductive element corresponds to the total energy required by each of the outputs OUT1j, OUT2i of the power supply. In particular, the switched-mode power supply ALM also comprises a slaving loop making it possible to drive the switching cell to obtain the output voltage desired on each of the outputs.

In the example illustrated in FIG. 3, a switching cell with two outputs has been represented. Each of the desired output voltages VS21 and VS11 is a regulated voltage whose value is fixed by the value of an external reference voltage VREF1 and VREF2, respectively. It is these reference voltages VREF1 and VREF2 which have opposite signs, for example, in the cellular mobile telephone application mentioned above.

The slaving loop BAS comprises a first elementary error amplifier or amplification means AMP1, whose positive input receives the voltage VREF1, and whose negative input is linked to the first output connection OUT11. The difference between the external reference voltage VREF1 and the output voltage VS11, is consequently amplified in the error amplifier AMP1, and the corresponding error voltage VERROR1 is an image of the elementary energy required on the output OUT11.

The slaving loop BAS likewise comprises a second elementary error amplifier or amplification means AMP2 receiving, on the one hand, the reference voltage VREF2 and, on the other hand, the voltage VS21. This amplifier AMP2 delivers an error voltage VERROR2, which is also representative of the elementary energy required on the output OUT21.

The slaving loop BAS comprises, additionally, a summation means SUM0, whose two inputs are respectively joined to the two outputs of the elementary error amplifiers AMP1 and AMP2. The output of the amplification means SUM0 consequently delivers a voltage VERROR0 which is representative of the total energy corresponding to the sum of the elementary energies required respectively by all the outputs in the course of each conduction cycle.

The slaving loop BAS also comprises a control pre-stage formed here of several comparators CMP0, CMP1 and CMP2. More precisely, the comparator CMP0, dubbed here main comparator, receives on its negative input the error voltage VERROR0, and on its positive input a voltage VRAMP corresponding to a ramp signal SRP generated in a conventional manner by a ramp generator GR of structure known per se. The output of the main comparator CMP0 consequently delivers a main pulsed control signal PWM0.

Additionally, the comparator CMP1 is a comparator termed "elementary", which is associated with the output OUT11. This comparator CMP1 receives on its negative input the voltage VERROR1 and on its positive input the voltage VRAMP. It delivers an elementary pulsed control signal PWM1. Likewise, the comparator CMP2 is a comparator termed "elementary", associated with the output OUT21, which delivers, after having received on its two inputs the error voltage VERROR2 and the voltage VRAMP, an elementary pulsed control signal PWM2. The signals PWM0, PWM1 and PWM2 are consequently pulsed signals the width of whose pulses is modulated by the level of the error voltage.

The slaving loop BAS control means additionally comprise a digital control stage ETNC, receiving the signals PWM0, PWM1, PWM2, as well as a clock signal CLK, which is additionally used to reinitialize the ramp generator at the start of each conduction cycle (this operation is performed on the rising edge of the clock CLK, for example). On the basis of the signals PWM0, PWM1 and PWM2, the control stage ETNC will formulate control signals intended to control, on the one hand, the breakers IT1 and IT2 of the switching cell CCM, and, on the other hand, the selection means, that is to say the transistors MOS11 and MOS21.

In a general manner, as illustrated in FIG. 4, there exist, for the switched-mode power supply with two outputs, four different possible configurations for the breakers IT1 and IT2, as well as for the transistors MOS11 and MOS21 of the selection means. In these figures, the reference IL designates the current flowing in the inductive element L. In configuration No. 1, the breakers IT1 (PMOS transistor) and IT2 (NMOS transistor) are conducting. They make it possible to inject energy into the inductive element L. In configuration No. 2, the breaker IT1 and the transistor MOS21 are conducting. The output OUT21 is consequently selected. The outputs OUT11 and OUT21 can also be selected simultaneously with configuration No. 3, in which it is the transistors MOS11 and MOS21 that are conducting. Finally, the output OUT11 can be selected with configuration No. 4, in which the breaker IT2 and the transistor MOS11 are conducting.

By considering the duty ratios E1, E2, E3, E4 of respectively configuration 1, configuration 2, configuration 3, configuration 4 which are equal to the ratio of the time, during a cycle, in which the switching cell is in a given configuration to the time of a cycle, it is possible to deduce therefrom the mean voltages VS11 and VS21. Thus, by considering that the output loads CH11 and CH21 are identical and equal to CH and that the resistance of the inductive element is RL, this then gives:

$$VS21 = \frac{(E2+E3) \cdot CH \cdot (E1+E2) \cdot VE}{-2 \cdot CH \cdot (E1+E2+E3) \cdot E1 + CH \cdot E1^2 + RL + CH \cdot (E1+E2)^2 + CH - 2 \cdot (E1+E2) \cdot CH + CH \cdot (E1+E2+E3)^2}$$

and:

$$VS11 = \frac{(E1+E2-1) \cdot CH \cdot (E1+E2) \cdot VE}{-2 \cdot CH \cdot (E1+E2+E3) \cdot E1 + CH \cdot E1^2 + RL + CH \cdot (E1+E2)^2 + CH - 2 \cdot (E1+E2) \cdot CH + CH \cdot (E1+E2+E3)^2}$$

Therefore, by choosing duty ratios such that: E1=E4, this actually gives: VS21=−VS11.

In a general manner, according to the particular embodiment described above, the various outputs which require energy will be polled and selected successively in a predetermined order which is the same for all the cycles. This makes it possible to ensure continuity of current in the inductive element L between the end of one conduction cycle and the start of the following conduction cycle.

However, it is also possible, in the course of one and the same conduction cycle, to select each of the configurations 1, 2, 3 or 4 several times according to the energy to be restored on each of the outputs OUT11, OUT21. Likewise, it is also possible, in the course of one and the same cycle, not to select one or more of the configurations 1, 2, 3, 4. The embodiment described thus makes it possible to retain a current in the inductive element L which is relatively low, even when the switched-mode power supply is used under voltage step-up.

Additionally, the embodiment may comprise only three external components to produce two symmetric voltages: an inductor and two capacitors. The transistors MOS1j and MOS2i of the selection means MSEL1, MSEL2 of the switching cell CCM can be N-channel or P-channel transistors. Their choice will depend on the application and the regulated value of the output voltages.

The invention is not limited to the embodiments which have just been described but embraces all variants thereof.

Thus the elementary breakers of the selection means MSEL1, MSEL2 may be formed of any type of switch that can be produced as an integrated circuit, for example bipolar transistors or IGBT transistors. The same holds for the breakers IT1 and IT2.

That which is claimed is:

1. A switched-mode power supply including a switching cell comprising:
   an inductive element having opposing connection nodes, one node being coupled to a supply voltage and the other node being coupled to a reference voltage;
   a first circuit breaker coupled between the supply voltage and one of the connection nodes of the inductive element, and a second circuit breaker coupled between the reference voltage and the other one of the connection nodes of the inductive element: and
   a plurality of individually selectable outputs;
   the opposing connection nodes of the inductive element being selectively coupled respectively to at least two of the individually selectable outputs so that the at least two individually selectable outputs are configured to generate at least one positive voltage and at least one negative voltage.

2. The switched-mode power supply according to claim 1, further comprising a control circuit to simultaneously select the at least two individually selectable outputs.

3. The switched-mode power supply according to claim 1, wherein the switching cell further comprises:
   a first controllable selection circuit having an input connection coupled to a first connection node of the opposing connection nodes of the inductive element, and at least one output connection respectively coupled to one of the plurality of individually selectable outputs;
   a second controllable selection circuit having an input connection coupled to a second connection node of the opposing connection nodes of the inductive element, and at least one output connection respectively coupled to one of the plurality of individually selectable outputs; and
   a respective capacitor for each of the plurality of individually selectable outputs and including a connection coupled to the corresponding output connection of the corresponding first and second controllable selection circuits.

4. The switched-mode power supply according to claim 1, further comprising a slaving loop to cyclically control the switching cell, and wherein the slaving loop comprises:
   a determination circuit to determine, in the course of a conduction cycle, a total energy corresponding to a sum of elementary energies required respectively by the outputs in the course of the conduction cycle; and
   a control circuit to control, in the course of the conduction cycle, the switching cell to inject the total energy into the inductive element at least once, to select outputs requiring an elementary energy, and to restore the corresponding elementary energy on selected outputs.

5. The switched-mode power supply according to claim 4, wherein the control circuit, in the course of each conduction cycle, selects successively and in a same predetermined order for each conduction cycle, the outputs requiring the elementary energy.

6. The switched-mode power supply according to claim 1, wherein one of the outputs connected to a first connection node of the opposing connection nodes of the inductive element, and one of the outputs connected to a second connection node of the opposing connection nodes of the inductive element present voltages of opposite signs and of equal absolute values.

7. A wireless communication terminal comprising a switched-mode power supply including a switching cell, the switching cell comprising:
   an inductive element having opposing connection nodes, one node being coupled to a supply voltage and the other node being coupled to a reference voltage;
   a first circuit breaker coupled between the supply voltage and one of the connection nodes of the inductive element, and a second circuit breaker coupled between the reference voltage and the other one of the connection nodes of the inductive element; and
   a plurality of individually selectable outputs;
   the opposing connection nodes of the inductive element being selectively coupled respectively to at least two of the individually selectable outputs so that the at least two individually selectable outputs are configured to generate at least one positive voltage and at least one negative voltage.

8. The wireless communication terminal according to claim 7, and further defining a cellular mobile telephone.

9. The wireless communication terminal according to claim 7, further comprising a battery and an associated audio amplifier, wherein the switched-mode power supply is powered by the battery, and a voltage for regulating the audio amplifier is defined by a voltage difference available between two outputs connected respectively to the opposing connections of the inductive element of the switched-mode power supply.

10. A method of controlling a switched-mode power supply including a switching cell comprising an inductive element having opposing connection nodes, one node being coupled to a supply voltage and the other node being coupled to a reference voltage, a first circuit breaker coupled between the supply voltage and one of the connection nodes of the inductive element, and a second circuit breaker coupled between the reference voltage and the other one of the connection nodes of the inductive element, and a plurality of individually selectable outputs, the opposing connection nodes of the inductive element being respectively coupled to at least two of the individually selectable outputs, the method comprising:
   controlling the switching cell by selecting at least two outputs respectively coupled to the opposing connection nodes of the inductive element so that the at least two outputs are configured to generate at least one positive voltage and at least one negative voltage.

11. The method according to claim 10, wherein controlling of the switching cell comprises simultaneously selecting at least two outputs respectively coupled to the opposing connections of the inductive element.

12. The method according to claim 10, wherein the switching cell is controllable cyclically, and wherein, in the course of a conduction cycle, a total energy corresponding to a sum of elementary energies required respectively by the outputs in the course of the conduction cycle is injected into the inductive element, outputs requiring an elementary energy are selected, and a corresponding elementary energy is restored on each selected output.

13. The method according to claim 12, wherein, in the course of the conduction cycle, the outputs requiring an elementary energy are selected successively and in a predetermined order for each conduction cycle.

14. The method according to claim 10, wherein two outputs coupled respectively to the opposing connections of the inductive element are selected to obtain voltages of opposite signs and of equal absolute values.

15. The method according to claim 10, wherein the switched-mode power supply is included in a wireless communication terminal comprising a battery and an associated audio amplifier, and wherein the switched-mode power supply is powered by the battery of the wireless communication terminal, and a voltage of the audio amplifier is regulated with a voltage difference available between two outputs coupled respectively to the opposing connections of the inductive element of the switched-mode power supply.

16. The method according to claim 15, wherein the wireless communication terminal defines a cellular mobile telephone.

* * * * *